(12) United States Patent
Kim et al.

(10) Patent No.: US 10,079,953 B2
(45) Date of Patent: Sep. 18, 2018

(54) IMAGE FORMING APPARATUS EXECUTING APPLICATION FOR PERFORMING IMAGE FORMING OPERATION, AND METHOD OF PERFORMING IMAGE FORMING OPERATION

(71) Applicant: S-Printing Solution Co., Ltd., Suwon-si, Gyeonggi-do (KR)

(72) Inventors: Hyo-eun Kim, Seoul (KR); Ju-ho Eum, Anyang-si (KR); Dong-kyu Heo, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/403,794

(22) Filed: Jan. 11, 2017

(65) Prior Publication Data
US 2017/0208204 A1 Jul. 20, 2017

(30) Foreign Application Priority Data
Jan. 19, 2016 (KR) ........................ 10-2016-0006466

(51) Int. Cl.
*H04N 1/21* (2006.01)
*H04N 1/00* (2006.01)
(Continued)

(52) U.S. Cl.
CPC ......... *H04N 1/2179* (2013.01); *G06F 3/1238* (2013.01); *G06F 12/14* (2013.01); *G06F 21/128* (2013.01); *G06F 21/31* (2013.01); *G06F 21/608* (2013.01); *H04N 1/0097* (2013.01); *H04N 1/00411* (2013.01); *H04N 2201/006* (2013.01); *H04N 2201/0094* (2013.01)

(58) Field of Classification Search
CPC ............. H04N 1/00411; H04N 1/0097; H04N 1/2179; G06F 8/30; G06F 9/44; G06F 3/1253; G06F 12/14; H04L 29/08072; H04L 67/02
USPC ................ 358/1.11–1.18, 1.9, 2.1, 400–404; 709/201–205, 219; 726/1–6, 17–21, 726/26–33
See application file for complete search history.

(56) References Cited

U.S. PATENT DOCUMENTS

2008/0091800 A1* 4/2008 Sorrentino ......... H04N 1/00244
709/219
2010/0118333 A1* 5/2010 Nakagawa ............ G06F 3/1208
358/1.15
(Continued)

*Primary Examiner* — Chad Dickerson
(74) *Attorney, Agent, or Firm* — Jefferson IP Law, LLP

(57) ABSTRACT

An image forming apparatus for executing an application for performing an image forming operation is provided. The apparatus includes an interface library. The interface library includes information about an image forming operation performable by the image forming apparatus, a user interface (UI) configured to provide a UI screen for receiving a request to perform the image forming operation, by referring to the interface library, at least one operation processor configured to call an application programming interface (API) corresponding to the image forming operation, based on the received request to perform the image forming operation, and an operation performer configured to perform the image forming operation requested to be performed, according to the call.

14 Claims, 11 Drawing Sheets

(51) Int. Cl.
*G06F 3/12*       (2006.01)
*G06F 21/31*      (2013.01)
*G06F 21/60*      (2013.01)
*G06F 21/12*      (2013.01)
*G06F 12/14*      (2006.01)

(56) References Cited

U.S. PATENT DOCUMENTS

| | | | |
|---|---|---|---|
| 2011/0055323 A1* | 3/2011 | Kawai | H04N 1/00244 709/203 |
| 2012/0268778 A1* | 10/2012 | Nakawaki | G06F 3/122 358/1.15 |
| 2013/0036420 A1* | 2/2013 | Ohishi | H04N 1/00973 718/100 |
| 2013/0246944 A1 | 9/2013 | Pandiyan et al. | |
| 2014/0082581 A1* | 3/2014 | Ohhashi | G06F 8/00 717/100 |
| 2015/0379382 A1* | 12/2015 | Mizoguchi | G06F 3/12 358/1.15 |

* cited by examiner

| Basic View | Advanced View |
|---|---|
| Scan Options | Scan Options |
| original Size: xoa::Media Size<br>darkness: xoa::Darkness | originalSize: xoa::Media Size<br>darkness: xoa::Darkness<br>color Altering Options: Color Altering Options<br>fine Density Options: Fine Density Options<br>... |

Scan Options color Removal Options: xoa::Color Removal Params
color Replacement Options:
::xoa::Color Replacement Params
color Replacement Options:
::xoa::Color Appointment Params

Color Removal Parms color Removal SubsBlue:
xoa::Generic Boolean
color Removal SubstCyan:
xoa::Generic Boolean
color Removal SubstGray:
xoa::Generic Boolean

| Name | Type | Description |
|---|---|---|
| sign | DOMString | The slash delimited string representing the path to an XOA-Web resource. No query parameters should be specified. |
| sign | boolean | Determines the value of the Accept http header. The default is application/json |
| timeout | | The timeout in milliseconds. This defaults to the value set in the XOAJSConnection instance that created this request. |
| content | DOMString or FormData or Blob or Document or ArrayBufferView | The following Types are accepted for the content attribute Blob A blob represents both the content, and stores the content Type. If a Blob is used for the content attribute, the content Type attribute is ignored. ArrayBufferView A Typed array. If a Typed array is set as the value for the content attribute, the content Type attribute is REQUIRED. FormData A FormData object. When set to a FormData object, the contentType attribute shall be ignored. This can be used to send multipart data. Document An XML Document. The content Type is assumed to be the content Type of the document unless the content Type attribute is set to a non-null value. In the case the content Type attribute is set to a non-null value, that value will be used. String A string. If the content is set to a string, then the content Type attribute is REQUIRED. Null If set to null, which is the default, no content will be transferred. The addFormParameter helper function will replace any other of content with encoded application/x-www-form-urlencoded parameters at request time if invoked. |
| content Type | DOMString | Depending on the value of the content attribute, this attribute may be ignored, SGWG to override the content Type, or is required. The default value is "null" This affects the content-Type header. The charset attribute may be added to the end of the Type transmitted to the device during the request. |

| Name | Type | Description |
|---|---|---|
| id | DOMString | This is an rfc4122-compliant UUID string that should be unique to this connection. Read-Only |
| signing Mode | XOAJSSigning Mode | Represents the method to use when signing requests. The default for this attribute is "HMAC-SHA1" |
| encrypt Sensitive Strings | boolean | The value of this attribute affects the how sensitive string Types are handled in requests. If not specified (or set as null), the signingMode attribute will determine the method for encrypting sensitive strings. If PLAINTEKT is selected as a signing mode, this will be assumed as false. If "HMAC-SHA1" is set as the signing mode, then the value of this attribute will be assumed to be true. If explicitly set to true, encryptSensitiveStrings shall result in the PBKDF2WithHmacSHA1-AES encoding of sensitive string Types. if explicitly set to false, only the plaintext prefix will be used to encode sensitive strings. This attribute does not affect decoding of sensitive strings in responses. The decoding of sensitive strings shall be conducted automatically based on whatever the device has responded with. |
| automatic Sensitive String Handling | boolean | The value of this attribute affects if sensitive strings are automatically recognized and encrypted|decrypted. If not specified, set to null, or true.The value is assumed to be true. This means that during a request, any sensitive strings will automatically be handled by this client. They will be prefixed with PLAINTEXT: if encryptSensitiveStrings is set to false. They will be encrypted using PBKDF2WithHmacSHA1-AES if encryptSensitiveStrings is set to true. If set to false Sensitive strings are ignored and assumed to be handled by the application. |
| timeout | unsigned long | Sets the default timeout when making a request. The default for this attribute is 0, which indicates no timeout. |
| always Override | boolean | If set to true and a newRequest operation is called, the resulting request object is configured to always utilize the X-HTTP-Method-Override header with a POST request instead of normal HTTP GET/DELETE/PUT methods. |
| last Event Handler | XOAJSWeb Socket Event Handler | Stores an instance of the last event handler that was created. If no event handler was created, this attribute will be null.Read-Only |

| Name | Type | Description |
| --- | --- | --- |
| received Time | unsigned long | The time the event was received by the Event Handler. Represented in the number of milliseconds elapsed since the first of January 1970. Read-Only |
| event Time | unsigned long | The timeout in milliseconds. This defaults to the value set in the XOAJSConnection instance that created this request. The time the event was received by the Event Handler. Represented in the number of milliseconds elapsed since the first of January 1970. Read-Only |
| eventId | DOMString | The unique identifier for the event. Read-Only |
| event Topic | DOMString | The event topic. Each event has its own defined topic string; this attribute carries this information. Read-Only |
| resource Path | DOMString | The path portion of the URL of the resource that is the source of the event. Read-Only |
| proximal Client | DOMString | If the event is closely related to the action of an external client, this identifies that client. This identification is represented by the application ID. If the event is not associated with any external action, this may be omitted. Read-Only |
| proximal User | DOMString | If the event is closely related to the action of an external client, this identifies the user associated with that client. This identification is represented by the principal ID. If the event is not associated with any external action, this may be omitted. Read-Only |
| event content | object | The content of the event. Read-Only |

ID
IMAGE FORMING APPARATUS EXECUTING APPLICATION FOR PERFORMING IMAGE FORMING OPERATION, AND METHOD OF PERFORMING IMAGE FORMING OPERATION

CROSS-REFERENCE TO RELATED APPLICATION(S)

This application claims the benefit under 35 U.S.C. § 119(a) of Korean patent application filed on Jan. 19, 2016 in the Korean Intellectual Property Office and assigned Serial number 10-2016-0006466, the entire disclosure of which is hereby incorporated by reference.

TECHNICAL FIELD

The present disclosure relates to a method of executing an application for performing an image forming operation. More particularly, the present disclosure relates to an image forming apparatus that executes the application for performing the image forming operation.

BACKGROUND

Types of image forming apparatuses include individual devices, such as printers, scanners, copy machines, and facsimile machines, and multi-function products (MFPs) in which various functions of different devices as described above are integrated in one device. Recently, image forming apparatuses may be connected to other user devices, such as mobile devices and laptop computers, through a network by including a wired communication module, such as an Ethernet module, or a wireless communication module, such as a Wi-Fi module, a Wi-Fi Direct module, a near field communication (NFC) module, a Bluetooth module, a Zigbee module, or an infrared data association (IrDA) module. In addition, image forming apparatuses may access a cloud server by using such modules and may use an operation and an application that is provided from the cloud server.

Moreover, as devices, such as user terminals, become more common, there is a need for methods in which not only personal computers (PCs) but also mobile devices manage and transmit printing data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of executing an application for performing an image forming operation, and an image forming apparatus that executes the application for performing the image forming operation.

Another aspect of the present disclosure is to provide an apparatus and method for a non-transitory computer-readable recording media having recorded thereon at least one computer program including commands, which when executed by a computer, performs a method. The method including providing a user interface (UI) screen for receiving a request to perform an image forming operation performable by the image forming apparatus, by referring to an interface library comprising information about the image forming operation performable by the image forming apparatus, calling an application programming interface (API) corresponding to the image forming operation, based on the received request to perform the image forming operation, and performing the image forming operation requested to be performed according to the call.

In accordance with an aspect of the present disclosure, an image forming apparatus configured to execute an application for performing an image forming operation is provided. The apparatus includes an interface library including information about an image forming operation performable by the image forming apparatus, a user interface (UI) configured to provide a UI screen for receiving a request to perform the image forming operation, by referring to the interface library; an operation processor configured to call an application programming interface (API) corresponding to the image forming operation, based on the received request to perform the image forming operation, and an operation performer configured to perform the image forming operation requested to be performed, according to the call.

In accordance with an aspect of the present disclosure, a printing system is provided. The printing system includes a device including an interface library including information about an image forming operation performable by an image forming apparatus, a UI configured to execute an application for receiving a request to perform the image forming operation by referring to the interface library, and an operation processor configured to call an API corresponding to the image forming operation, based on the received request to perform the image forming operation, and the image forming apparatus configured to perform the image forming operation requested to be performed according to the call from the device.

In accordance with an aspect of the present disclosure, a method of performing an image forming operation by an image forming apparatus is provided. The method includes the operations of providing a UI screen for receiving a request to perform an image forming operation performable by the image forming apparatus, by referring to an interface library including information about the image forming operation performable by the image forming apparatus, calling an API corresponding to the image forming operation, based on the received request to perform the image forming operation, and performing the image forming operation requested to be performed according to the call.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram for explaining a method of executing an application for performing an image forming operation, according to an embodiment of the present disclosure;

FIGS. 7, 8, 9 and 10 illustrate a detailed structure of an operation processor that performs an image forming operation, according to various embodiments of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "configured" and "include" used herein should not be construed as necessarily including all components or steps written in the specification, but may include only some of the components or steps or may further include additional components or steps.

While such terms as "first", "second", etc., may be used to describe various components, such components must not be limited to the above terms. The above terms are used only to distinguish one component from another.

The various embodiments below relate to an image forming apparatus that executes an application for performing an image forming operation, and a method of performing an image forming operation by the image forming apparatus, and a detailed description of matters well known to one of ordinary skill in the art to which the following embodiments pertain will be omitted.

Figure 1:
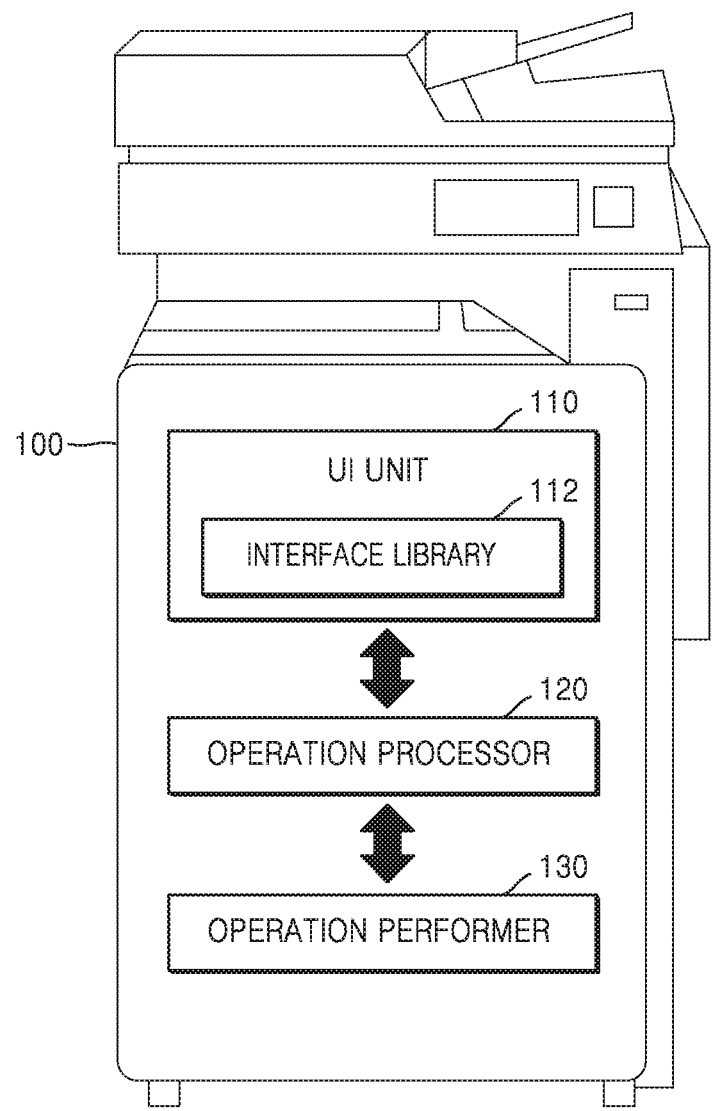
FIG. 1 illustrates an image forming apparatus that executes an application for performing an image forming operation, according to an embodiment of the present disclosure.

FIG. 1 illustrates an image forming apparatus 100 that executes an application for performing an image forming operation, according to an embodiment of the present disclosure.

Referring to FIG. 1, as the image forming apparatus 100 is connectable to the internet and includes a high-performance user interface panel, the image forming apparatus 100 is able to perform various image forming operations and increasingly needs to drive various applications for performing the various image forming operations. For example, the image forming apparatus 100 may execute not only an application previously installed in the image forming apparatus 100 but also a web application that is usable via the internet or intranet.

For example, the image forming apparatus 100 may execute a web application via a browser included in a user interface (UI) 110 or a separate compiler.

As the image forming apparatus 100 executes various such applications, the image forming apparatus 100 may frequently transmit or receive data to or from an external device, such as a web server, or may frequently refer to data flowing between the internal modules of the image forming apparatus 100, and the size of the data may increase. Accordingly, an execution speed of an application may decrease.

Thus, the image forming apparatus 100 may provide an independent application executing method to a system of the image forming apparatus 100, thereby reducing the amount of data and the number of times the data is transmitted or received, and increasing an operation performing speed of the image forming apparatus 100.

In detail, referring to FIG. 1, the image forming apparatus 100 may include the UI 110, an interface library 112, an operation processor 120, and an operation performer 130.

The image forming apparatus 100 may include one of a printer, a scanner, a facsimile machine, and a multi-function product (MFP) having various functions, such as a print function, a scan function, a copy function, a facsimile function, an e-mail transfer function, a storage function, a character recognition function, a file transfer protocol (FTP) function, and a web browsing function. In FIG. 1, only components related to the present embodiment are described so as not to obscure the features of the present embodiment of the present disclosure. However, it will be understood by one of ordinary skill in the art that general-use hardware components other than the components illustrated in FIG. 1 may be further included and therefore, the present disclosure is not limited thereto.

The UI 110 may provide information to a user and receive an input from the user. For example, the UI 110 may include a display having a display function, such as a monitor, a touchscreen, a liquid crystal display (LCD), or a light-emitting diode (LED), and an input device having an input function, such as a touch panel, a keyboard, a mouse, or physical buttons, and may further include a processor that controls these devices.

The UI 110 may provide the user with a list of image forming operations performable by the image forming apparatus 100, and receive from the user a request to perform an image forming operation. For example, the UI 110 may provide a UI screen for receiving a user input of selecting one of the image forming operations performable by the image forming apparatus 100, such as printing, scanning, copying, faxing, e-mail transferring, storing, a FTP operation, and web browsing.

In this case, the UI 110 may provide a UI screen including the image forming operations performable by the image forming apparatus 100 via a browser by referring to the interface library 112 included in the UI 110 without directly referring to the operation performer 130.

The interface library 112 includes information about the image forming operations performable by the image forming apparatus 100, and may be written in a script language, such as a java script.

For example, the interface library 112 may include identification (ID) information of the image forming operations performable by the image forming apparatus 100, and setting information necessary for performing the image forming operations. The ID information of the image forming operations may represent the types of image forming operations, such as printing, scanning, copying, faxing, e-mail transferring, storing, character recognition, an FTP operation, and web browsing. The setting information necessary for performing the image forming operations may represent, for example, a type of printing paper, the number of printouts, and a printing method.

The interface library 112 may include information about applications executable by the image forming apparatus 100. The UI 110 may provide the user with the applications executable by the image forming apparatus 100 by referring to the interface library 112 and may receive from the user a selection of an application that is to be executed.

The UI 110 may execute the selected application by referring to the interface library 112. For example, the interface library 112 may include location information of execution data for executing an application. The UI 110 may execute the selected application by referring to the interface library 112 and may provide the user with an execution screen or the like of the selected application.

The interface library 112 may be stored in a non-volatile memory included in the image forming apparatus 100. For example, the interface library 112 may be included in a non-volatile memory, such as a read only memory (ROM) or a flash memory.

The UI 110 may receive from the user a request to perform an image forming operation via the executed application. The UI 110 may receive ID information and setting information of the image forming operation requested to be performed, and may generate the image forming operation by using the received pieces of information.

When the image forming operation is generated, the UI 110 may transmit a request to perform the generated image forming operation to the operation processor 120.

The operation processor 120 (i.e. at least one processor) performs data conversion and data distribution so that all image forming operations generated via applications executed by the image forming apparatus 100 may be performed in an appropriate order and at an appropriate speed, and may be implemented within or outside the UI 110.

The operation processor 120 may call an application programming interface (API) corresponding to an image forming operation, based on the request received from the UI 110 to perform the image forming operation. At this time, the operation processor 120 may use a representational state transfer (REST)-type API, namely, a RESTful API. The operation processor 120 may include an API library for the image forming operations performable by the operation performer 130.

For example, when the image forming operation requested to be performed is a scan operation, the operation processor 120 may call a scan API corresponding to the scan operation. The scan API may drive a scan module for performing a scan operation, which is included in the operation performer 130.

At this time, the operation processor 120 may convert a format of the received request to perform an image forming operation into a predetermined data format for calling an API corresponding to the image forming operation. For example, the predetermined data format may be JavaScript Object Notation (JSON) format, such as Number, String, Boolean, Array, Object, Symbol, null, or undefined.

In other words, with reference to FIG. 1, the operation processor 120 may analyze the received request to perform the image forming operation in order to convert the received request into a request for calling an API corresponding to the image forming operation. In addition, the operation processor 120 may receive data representing a performance result of the image forming operation from the operation performer 130 and may transmit the received data to the UI 110. At this time, the operation processor 120 may convert a format of the data representing the performance result of the image forming operation and transmit the format-changed data.

In addition, the operation processor 120 may perform a user authentication required to perform the image forming operation. For example, the operation processor 120 may receive user authentication information obtained by the UI 110 to perform the user authentication. The operation processor 120 may determine whether the received user authentication information is valid, by analyzing pre-stored user information and the received user authentication information. When it is determined that the user authentication information is not valid, the operation processor 120 may terminate connection with the UI 110 and data transmission or reception to or from the UI 110.

The operation processor 120 may manage a connection to the operation performer 130 and settings of the connection. At this time, the operation processor 120 may set a real-time bidirectional connection by using a web socket method, and thus may immediately receive information about an event generated by the operation performer 130.

The operation performer 130 may directly perform an image forming operation, and may include a plurality of operation modules that respectively perform various image forming operations. For example, the operation performer 130 may include a print module, a scan module, a copy module, a facsimile module, an e-mail transfer module, a storage module, and a character recognition module.

When the operation performer 130 receives from the operation processor 120 the request to perform an image forming operation, the operation performer 130 may perform the image forming operation. In detail, the operation performer 130 may perform the image forming operation by driving a module corresponding to the API called by the operation processor 120 from among the modules included in the operation performer 130.

For example, in response to a request from the UI 110 to perform a scan operation, the operation processor 120 may convert the request to perform the scan operation and call a scan API corresponding to the scan operation, and the operation performer 130 may perform the scan operation by driving the scan module.

Figure 2:
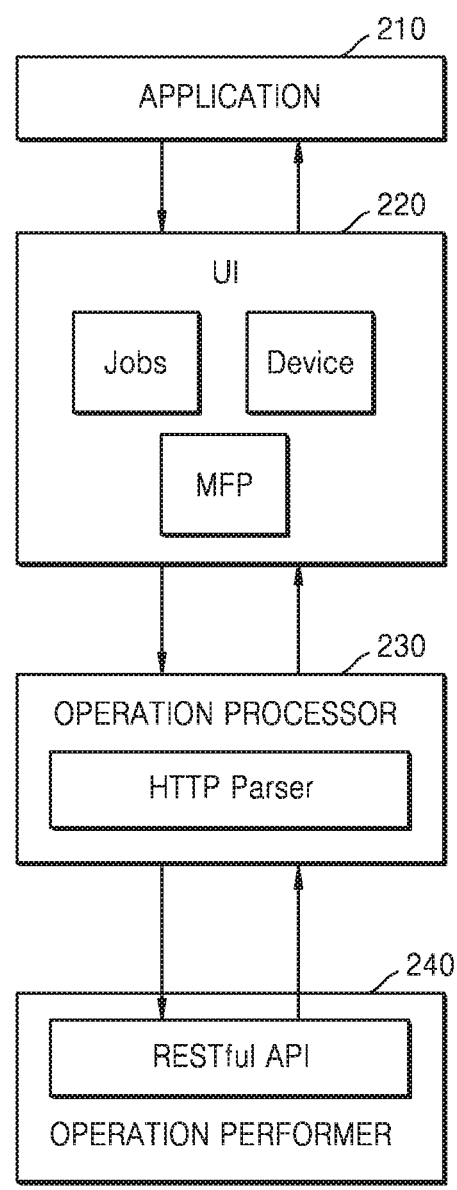
FIG. 2 is a block diagram illustrating in detail an internal structure of the image forming apparatus of FIG. 1, which executes an application for performing an image forming operation according to an embodiment of the present disclosure.

FIG. 2 is a block diagram illustrating in detail an internal structure of the image forming apparatus 100 of FIG. 1, which executes an application for performing an image forming operation according to an embodiment of the present disclosure.

Referring to FIG. 2, the image forming apparatus 100 may include an application 210, a UI 220, an operation processor 230, and an operation performer 240. The application 210 may be actually executed within the UI 220 because the application 210 is a program executed within the image forming apparatus 100. In FIG. 2, only components related to the present embodiment are described so as not to obscure the features of the present embodiment of the present disclosure. However, it will be understood by one of ordinary skill in the art that general-use hardware components other than the components illustrated in FIG. 2 may be further included, and therefore the present disclosure is not limited thereto.

The UI 220 may provide a UI screen including image forming operations performable by the image forming apparatus 100 and applications executable by the image forming apparatus 100 via a browser, by referring to an interface library included in the UI 220.

The UI 220 may include an interface library written in a script language, such as a java script, and the interface library may include information about an image forming operation, such as operations, devices, and image forming apparatuses (e.g., MFPs).

In detail, the operation information may include ID information of the image forming operations performable by the image forming apparatus 100, and setting information necessary for performing the image forming operations. For example, the ID information of the image forming operations may represent the types of image forming operations, such as printing, scanning, copying, faxing, e-mail transferring, storing, character recognition, an FTP operation, and web browsing. The setting information necessary for performing the image forming operations may represent, for example, the type of printing paper, the number of printouts, and a printing method.

With reference to FIGS. 1 and 2, the UI 220 is able to provide information about the image forming operations performable by the image forming apparatus 100 to a user by using operation information, without referring to an external server or the operation performer 240.

The device information may include information about devices that may be used to perform an image forming operation. For example, the device information may represent a user device (e.g., a mobile phone or a desk top computer of a user) or a web server that transmits or receives data to or from the image forming apparatus 100.

The UI 220 may provide information about devices that may be used to perform a function provided by the image forming apparatus 100 by using the device information. For example, the UI 220 may provide information about a user device capable of e-mail transferring to the user, and may receive a request to perform an e-mail transfer operation from the user.

The image forming apparatus information is about a plurality of image forming apparatuses including the image forming apparatus 100, and may include location information, performance information, and status information of the image forming apparatuses.

The UI 220 may also include information about the applications executable by the image forming apparatus 100. The UI 220 may provide the user with a UI screen including the applications executable by the image forming apparatus 100 by referring to the information about the applications and may receive from the user a selection of an application that is to be executed. The UI 220 may execute an application according to a selection of the user, by directly referring to the interface library.

In response to a request from the user to perform an image forming operation, the UI 220 may generate the image forming operation and transmit a request to perform the generated image forming operation to the operation processor 230.

The operation processor 230 may convert and distribute the received request to perform the generated image forming operation, and transmit the converted and distributed request to the operation performer 240. The operation processor 230 may transmit or receive data to or from the operation performer 240 by using a hypertext transfer protocol (HTTP) method.

In detail, the operation processor 230 including an API library for image forming operations performable by the operation performer 240 may call an API corresponding to the image forming operation requested to be performed.

The operation performer 240 may perform the image forming operation requested to be performed by driving a called module from among the plurality of operation modules included in the operation performer 240, and may return a performance result of the image forming operation to the operation processor 230.

Thus, the image forming apparatus 100 may provide an independent application executing method to a system of the image forming apparatus 100, thereby reducing the amount of data and the number of times the data is transmitted or received, and increasing an operation performing speed of the image forming apparatus 100.

Figure 3:
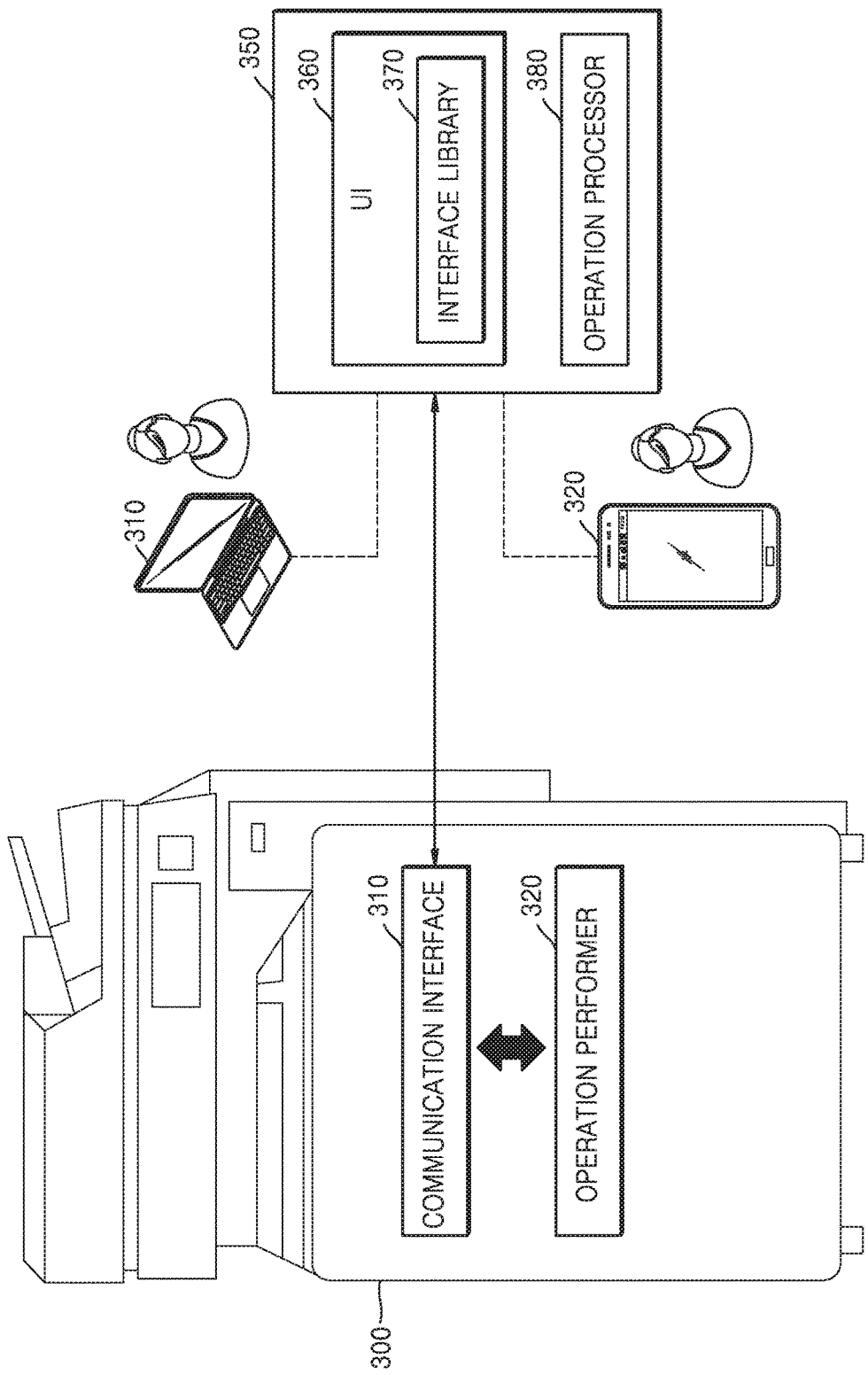
FIG. 3 is a schematic diagram for explaining a method, performed by an image forming apparatus for performing an image forming operation according to an embodiment of the present disclosure.

FIG. 3 is a schematic diagram for explaining a method, performed by an image forming apparatus 300 according to another embodiment, of performing an image forming operation according to an embodiment of the present disclosure.

Referring to FIG. 3, the image forming apparatus 300 may include a communication interface 310 and an operation performer 320, and a device 350 includes a UI 360, an interface library 370, and an operation processor 380.

The device 350 may be used to perform an image forming operation. Examples of the device 350 may include user devices (e.g., a mobile phone, a smartphone, personal digital assistants (PDA), a portable multimedia player (PMP), a PC, or a tablet) and server devices (e.g., a web server), but embodiments are not limited thereto. Devices capable of transmitting or receiving data to or from the image forming apparatus 300 may be used as the device 350.

The user may request the image forming apparatus 300 to perform an image forming operation, via the device 350 according to an embodiment of the present disclosure.

In detail, referring to FIG. 3, the UI 360 of the device 350 may provide the user with a list of image forming operations performable by the image forming apparatus 300, and receive from the user a request to perform an image forming operation. For example, the UI 360 may provide a UI screen for receiving a user input of selecting one of the image forming operations performable by the image forming apparatus 300, such as printing, scanning, copying, faxing, e-mail transferring, storing, an FTP operation, and web browsing.

At this time, the UI 360 of the device 350 may provide a UI screen by referring to the interface library 370, without receiving the list of the image forming operations performable by the image forming apparatus 300.

The interface library 370 includes information about the image forming operations performable by the image forming apparatus 300, and may be written in a script language, such as a java script.

For example, the interface library 370 may include ID information of the image forming operations performable by the image forming apparatus 300, and setting information necessary for performing the image forming operations. The ID information of the image forming operations may represent the types of image forming operations, such as printing, scanning, copying, faxing, e-mail transferring, storing, character recognition, an FTP operation, and web browsing. The setting information necessary for performing the image forming operations may represent, for example, the type of printing paper, the number of printouts, and a printing method.

The interface library 370 may include information about applications executable by the image forming apparatus 300. The UI 360 may provide the user with the applications executable by the image forming apparatus 300 by referring to the interface library 370 and may receive from the user a selection of an application that is to be executed.

The UI 360 may execute the selected application by referring to the interface library 370. For example, the interface library 370 may include location information of execution data for executing an application. The UI 360 may execute the selected application by referring to the interface library 370 and may provide the user with an execution screen or the like of the selected application via a browser.

The interface library 370 may be stored in a non-volatile memory included in the device 350. For example, the interface library 370 may be included in a non-volatile memory, such as a ROM or a flash memory.

The UI 360 may receive from the user a request to perform an image forming operation via the executed application. The UI 360 may receive ID information and setting information of the image forming operation requested to be performed, and may generate the image forming operation by using the received pieces of information.

When the image forming operation is generated, the UI 360 may transmit a request to perform the generated image forming operation to the operation processor 380.

The operation processor 380 performs data conversion and data distribution so that all of image forming operations generated via applications executed by the device 350 may be performed in an appropriate order and at an appropriate speed, and may be implemented within or outside the UI 360.

The operation processor 380 may call an API corresponding to the generated image forming operation, based on the request received from the UI 360 to perform the generated image forming operation. The operation processor 380 may include an API library for the image forming operations performable by the operation performer 320 of the image forming apparatus 300.

For example, when the image forming operation requested to be performed is a scan operation, the operation processor 380 may call a scan API corresponding to the scan operation. The scan API may drive a scan module for performing a scan operation, which is included in the operation performer 320.

At this time, the operation processor 380 may convert a format of the received request to perform an image forming operation into a predetermined data format for calling an API corresponding to the image forming operation. For example, the predetermined data format may be a JSON format, such as Number, String, Boolean, Array, Object, Symbol, null, or undefined.

In other words, with reference to FIG. 3, the operation processor 380 may analyze the received request to perform the image forming operation in order to convert the received request into a request for calling an API corresponding to the image forming operation. In addition, the operation processor 380 may receive data representing a performance result of the image forming operation from the operation performer 320 and may transmit the received data to the UI 360. At this time, the operation processor 380 may convert a format of the data representing the performance result of the image forming operation and transmit the format-changed data.

The operation processor 380 may transmit or receive data to or from the operation performer 320, via a communication interface (not shown) of the device 350 and the communication interface 310 of the image forming apparatus 300. The operation processor 380 may transmit or receive data to or from the operation performer 320 by using an HTTP method.

The operation processor 380 may perform a user authentication required to perform the image forming operation. For example, the operation processor 380 may receive user authentication information obtained by the UI 360 to perform the user authentication. The operation processor 380 may determine whether the received user authentication information is valid, by analyzing user information stored in the image forming apparatus 300 and the received user authentication information. When it is determined that the user authentication information is not valid, the operation processor 380 may terminate connection with the UI 360 and data transmission or reception to or from the UI 360.

The operation processor 380 may manage a connection to the image forming apparatus 300 and settings of the connection. At this time, the operation processor 380 may set a real-time bidirectional connection by using a web socket method, and thus may immediately receive information about an event generated by the image forming apparatus 300.

The image forming apparatus 300 may receive from the device 350 a request to perform an image forming operation and may perform the image forming operation. The communication interface 310 of the image forming apparatus 300 may transmit or receive data to or from external devices. The operation performer 320 of the image forming apparatus 300 may directly perform an image forming operation, and may include a plurality of operation modules that respectively perform various image forming operations. For example, the operation performer 320 may include a print module, a scan module, a copy module, a facsimile module, an e-mail transfer module, a storage module, and a character recognition module.

When the operation performer 320 receives the request to perform an image forming operation from the device 350 via the communication interface 310, the operation performer 320 may perform the image forming operation. In detail, the operation performer 320 may perform the image forming operation by driving a module corresponding to the API called by the operation processor 380 from among the modules included in the operation performer 320.

For example, in response to a request from the user interface unit 360 of the device 350 to perform a print operation, the operation processor 380 may convert the request to perform the print operation to call a print API corresponding to the print operation, and the operation performer 320 may perform the print operation by driving the print module.

Figure 4:
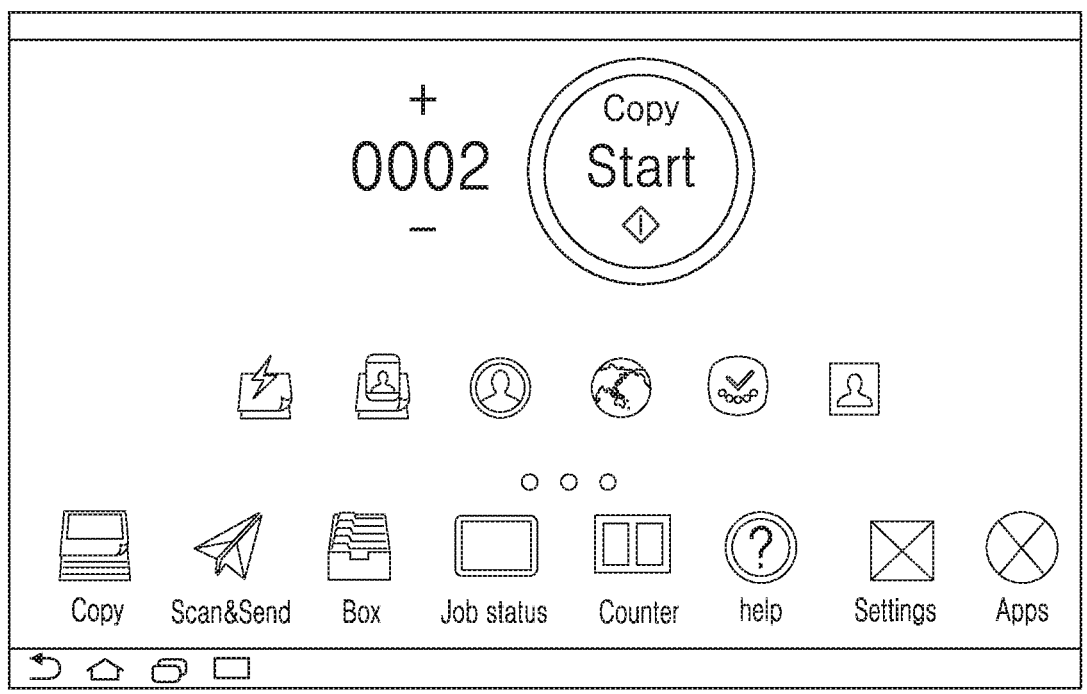
FIG. 4 illustrates a user interface (UI) screen image that is provided by the image forming apparatus of FIG. 1, according to an embodiment of the present disclosure.

FIG. 4 illustrates a UI screen image 400 that is provided by the image forming apparatus 100 of FIG. 1, according to an embodiment of the present disclosure.

Referring to FIG. 4, the image forming apparatus 100 may provide a UI screen including various image forming operations performable by the image forming apparatus 100 and applications executable by the image forming apparatus 100.

The image forming apparatus 100 may provide a method of executing an application, which is a system, by using a UI screen that constitutes an independent single layer (for example, the UI 110 of FIG. 1).

In detail, the image forming apparatus 100 may provide a user with a UI screen, such as, the UI screen image 400 of FIG. 4, by referring to an interface library pre-stored in the UI 110. The interface library may include information about the image forming operations performable by the image forming apparatus 100 and information about the applications executable by the image forming apparatus 100.

For example, the image forming apparatus 100 may provide a print operation performable by the image forming apparatus 100 to the user by referring to the interface library, and, when the user selects the print operation, the image forming apparatus 100 may provide setting information necessary for performing the print operation. The user may generate a print operation by requesting for performance of a print operation via a UI screen and inputting setting information of the print operation.

The image forming apparatus 100 may provide a character recognition application to the user by referring to the interface library, and may execute the character recognition application when the user selects the character recognition application. The image forming apparatus 100 may independently execute the character recognition application by referring to the interface library.

When the image forming operation is generated using the executed application, the image forming apparatus 100 may transmit a request to perform the generated image forming operation to an operation processor that performs operation conversion and data distribution (for example, the operation processor 120 of FIG. 1).

Figure 5:
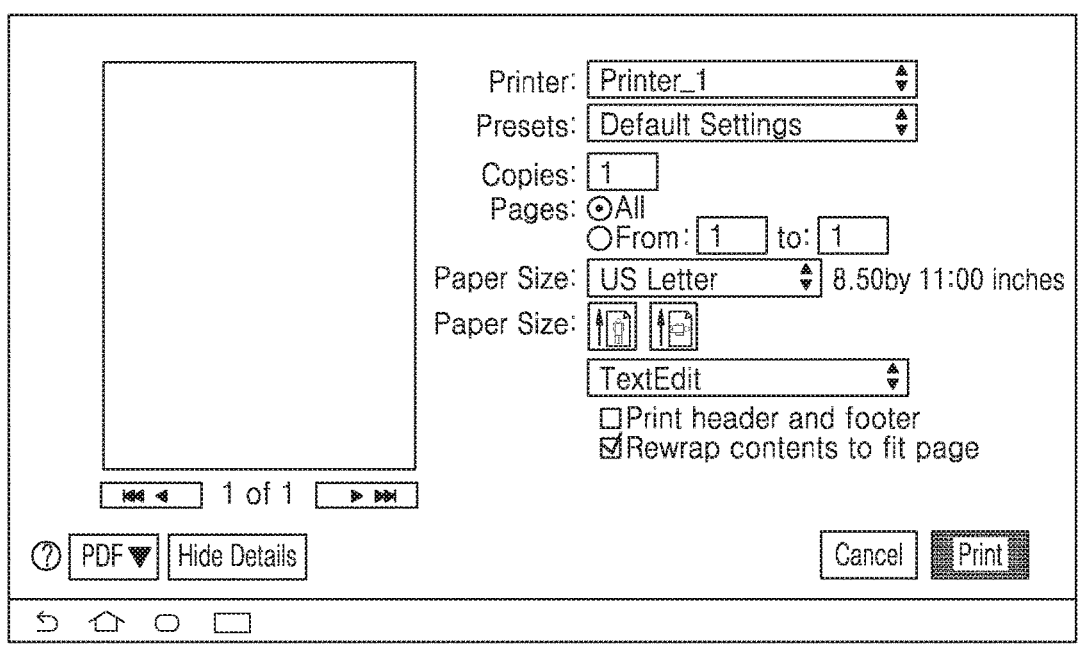
FIG. 5 illustrates a UI screen image that is provided by the image forming apparatus of FIG. 1, according to an embodiment of the present disclosure.

FIG. 5 illustrates a UI screen image 500 that is provided by the image forming apparatus 100 of FIG. 1, according to an embodiment of the present disclosure.

Referring to FIG. 5, the image forming apparatus 100 may provide a UI screen including the UI screen image 500 for executing a print application.

The image forming apparatus 100 may execute the print application selected by a user by referring to the interface library, via the UI (for example, the UI 110 of FIG. 1).

When the print operation is executed, the image forming apparatus 100 may provide pieces of setting information necessary to perform the print operation by referring to the interface library.

For example, the image forming apparatus 100 may provide the user with ID information of image forming apparatuses capable of performing a print operation, and may receive a user input of selecting an image forming apparatus that is to perform an image forming operation. The image forming apparatus 100 may provide ID information of the image forming apparatus 100 by default.

The image forming apparatus 100 may provide the user with setting information for setting the type of printing paper, the number of printouts, and a printing method, and receive a user input of selecting setting information from the user.

The image forming apparatus 100 may generate an image forming operation based on inputs received from the user, and may transmit a request to perform the generated image forming operation to an operation processor that performs operation conversion and operation distribution (for example, the operation processor 120 of FIG. 1).

FIG. 6 illustrates a diagram 600 for explaining a method of executing an application for performing an image forming operation, according to an embodiment of the present disclosure.

Referring to FIG. 6, the image forming apparatus 100 of FIG. 1 may include information about the image forming operations performable by the image forming apparatus 100, within the UI 110. The UI 110 of the image forming apparatus 100 may provide a user with a UI screen for generating an image forming operation by using the information about the image forming operations when an application is executed.

For example, the information about the image forming operations may include ID information of the image forming operations performable by the image forming apparatus 100, and setting information necessary for performing the image forming operations. The ID information of the image forming operations may represent the types of image forming operations, such as printing, scanning, copying, faxing, e-mail transferring, storing, character recognition, an FTP operation, and web browsing. The setting information necessary for performing the image forming operations may represent, for example, the type of printing paper, the number of printouts, and a printing method.

Referring to FIG. 6, the UI 110 of the image forming apparatus 100 may classify the information about the image forming operations into a basic view and an advanced view according to the amount of information or a specific degree of information and include the information about the image forming operations according to the classification. For example, information about the image forming operations classified into the advanced view may include more pieces of ID information of the image forming operations than information about the image forming operations classified into the basic view, and thus provide more or additional performable image forming operations. In addition, the information about the image forming operations classified into the advanced view may provide more detailed setting information of the image forming operations than the information about the image forming operations classified into the basic view.

The information about the image forming operations may be set such that different image forming apparatuses may use different classes of information about image forming operations.

The information about the image forming operations may be set such that different users may use different information about image forming operations classified according to the authorities of the different users.

The information about the image forming operations may be set such that the image forming apparatus 100 may use different classes of information about image forming operations according to a load of a currently-waiting operation. For example, when a currently-waiting operation has a large load, the image forming apparatus 100 may provide the information about the image forming operations classified into the basic view, thereby reducing the complexity of operations.

FIGS. 7, 8, 9 and 10 illustrate a detailed structure of an operation processor 700 that performs an image forming operation, according to various embodiments of the present disclosure.

The operation processor 700 according to an embodiment of the present disclosure may be included in an image forming apparatus (for example, the image forming apparatus 100 of FIG. 1) or a device (for example, the device 350 of FIG. 3). The operation processor 700 may convert and distribute data so that all image forming operations generated via applications executed by the image forming apparatuses 100 and 300 may be performed in an appropriate order and at an appropriate speed.

Figure 7:
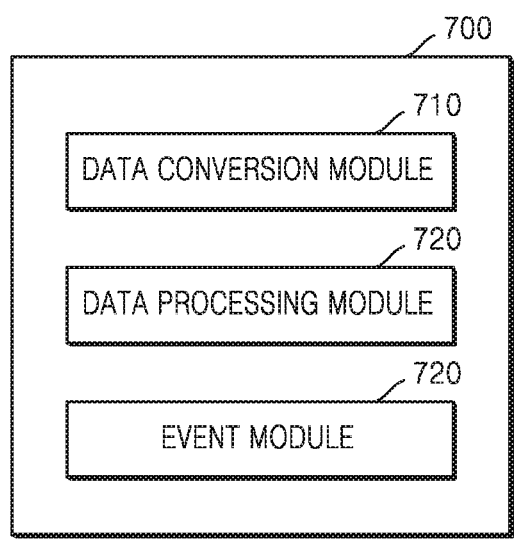

Referring to FIG. 7, the operation processor 700 may include a data conversion module 710, a data processing module 720, and an event module 730.

In response to a request to perform an image forming operation, the data conversion module 710 may convert a format of the received request to perform the image forming operation into a predetermined data format for calling an API corresponding to the image forming operation. For example, the predetermined data format may be a JSON format, such as Number, String, Boolean, Array, Object, Symbol, null, or undefined.

In other words, the data conversion module 710 may analyze the received request to perform the image forming operation in order to convert the received request into a request for calling an API corresponding to the image forming operation. The data conversion module 710 may receive data representing a performance result of the image forming operation from the operation performers 130 and 320 and may convert the format of the received data representing the performance result of the image forming operation to transmit the received data to the UIs 110 and 360. For example, the data conversion module 710 may be implemented based on interfaces shown in a table 800 of FIG. 8, but embodiments of the present disclosure are not limited thereto. The data conversion module 710 may be implemented using various methods.

The data processing module 720 may transmit the converted request to perform the image forming operation to the operation performers 130 and 320. At this time, the data processing module 720 may transmit or receive the converted request to perform the image forming operation, by using a queue. The data processing module 720 may be implemented based on interfaces shown in a table 900 of FIG. 9, but embodiments of the present disclosure are not limited thereto. The data processing module 720 may be implemented using various methods.

The data processing module 720 may call an API corresponding to the image forming operation, based on the received request to perform the image forming operation. The data processing module 720 may call a RESTful API corresponding to the image forming operation. The data processing module 720 may include an API library for the image forming operations performable by the operation performers 130 and 320.

The event module 730 may manage connections to the operation performers 130 and 320 and settings of the connections. At this time, the event module 730 may set a real-time bidirectional connection by using a web socket method, and thus may immediately receive information about events generated by the operation performers 130 and 320 without requests. The event module 730 may be implemented based on interfaces shown in a table 1000 of FIG. 10, but embodiments of the present disclosure are not limited thereto. The event module 730 may be implemented using various methods.

Figure 11:
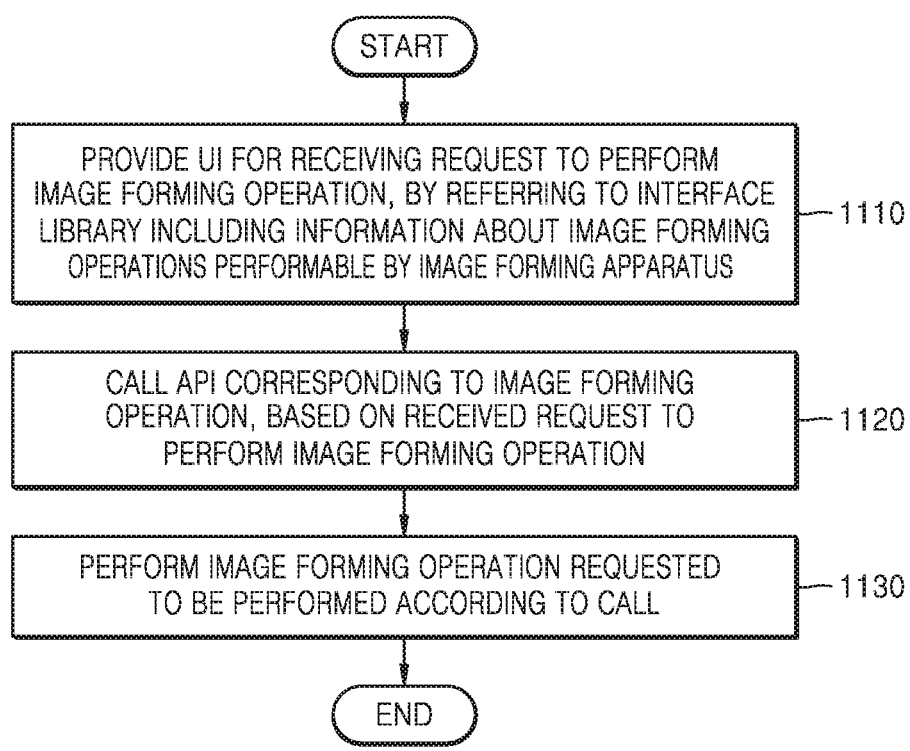
FIG. 11 is a flowchart of a method, performed by the image forming apparatus of FIG. 1, of performing an image forming operation, according to an embodiment of the present disclosure.

FIG. 11 is a flowchart of a method, performed by the image forming apparatus 100 of FIG. 1, of performing an image forming operation, according to an embodiment of the present disclosure.

Referring to FIG. 11, in operation 1110, the image forming apparatus 100 may provide a UI screen for receiving a request to perform an image forming operation, by referring to an interface library including information about the image forming operations performable by the image forming apparatus 100.

The image forming apparatus 100 may provide a user with a list of image forming operations performable by the image forming apparatus 100, and receive from the user a request to perform an image forming operation. For example, the image forming apparatus 100 may provide a UI screen for receiving a user input of selecting one of the image forming operations performable by the image forming apparatus 100, such as printing, scanning, copying, faxing, e-mail transferring, storing, an FTP operation, and web browsing.

In this case, the image forming apparatus 100 may provide a UI screen including the image forming operations performable by the image forming apparatus 100 via a browser by referring to the interface library 112 included in the UI 110 where an application is executed.

The image forming apparatus 100 may provide information about applications executable by the image forming apparatus 100 to the user by referring to the interface library 112, and may receive from the user a selection of an application that is to be executed. The image forming apparatus 100 may receive from the user a request to perform an image forming operation via the executed application.

In operation 1120, the image forming apparatus 100 may call an API corresponding to the image forming operation, based on the received request to perform the image forming operation. At this time, a RESTful API may be used.

The image forming apparatus 100 may call an API corresponding to the image forming operation requested to be performed, by using an API library for image forming operations performable by the operation performer 130, the API library being included in the operation processor 120 (shown in FIG. 1).

At this time, the image forming apparatus 100 may convert a format of the request received from the UI 110 to perform an image forming operation into a predetermined data format for calling an API corresponding to the image forming operation. In other words, the image forming apparatus 100 may analyze the received request to perform the image forming operation in order to convert the received request into a request for calling an API corresponding to the image forming operation, and may transmit the request for calling the API.

In operation 1130, the image forming apparatus 100 may perform the image forming operation requested to be performed according to the call. The image forming apparatus 100 may perform the image forming operation requested to be performed by using a plurality of operation modules that respectively perform various image forming operations, the plurality of operation modules being included in the operation performer 130.

In detail, the image forming apparatus 100 may perform the image forming operation by driving a module corresponding to the API called from among the modules included in the operation performer 130.

The above-described methods can be written as computer programs and can be implemented in general-use digital computers that execute the programs using a non-transitory computer readable recording medium. A structure of the data used in the above-described methods may be recorded in a non-transitory computer readable recording medium in several ways. Examples of the non-transitory computer readable recording medium include magnetic storage media (e.g., ROM, floppy disks, hard disks, etc.), optical recording media (e.g., CD-ROMs, or DVDs), etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image forming apparatus to execute an application for performing an image forming operation, the image forming apparatus comprising:
    a memory to store an interface library comprising information about an image forming operation performable by the image forming apparatus;
    a user interface (UI) to provide a UI screen for receiving a request to perform the image forming operation, by referring to the interface library; and
    at least one operation processor to:
        authenticate a user based on authentication information received via the UI,
        call an application programming interface (API), corresponding to the image forming operation, based on the received request to perform the image forming operation and a result of the authentication by converting a format of the received request to perform the image forming operation into a predetermined data format for calling the API corresponding to the image forming operation, and
        control an operation performer to perform the image forming operation requested to be performed according to the call,
    wherein the predetermined data format is JavaScript Standard Object Notation (JSON).

2. The image forming apparatus of claim 1, wherein the interface library comprises information about an application executable by the image forming apparatus.

3. The image forming apparatus of claim 2, wherein the UI:
    provides a UI screen for receiving a request to execute an application by referring to the interface library, and
    executes the application requested to be executed.

4. The image forming apparatus of claim 1, wherein the interface library further comprises:
    identification (ID) information of an image forming operation performable by the operation performer, and
    setting information necessary for performing the image forming operation.

5. The image forming apparatus of claim 1, wherein the memory comprises a non-volatile memory.

6. The image forming apparatus of claim 1, wherein the interface library is written in a java script language.

7. A printing system comprising:
    a device comprising an interface library, the interface library comprising information about an image forming operation performable by an image forming apparatus;
    a user interface (UI) to execute an application for receiving a request to perform the image forming operation by referring to the interface library; and
    at least one operation processor to:
        authenticate a user based on authentication information received via the UI, and
        call an application programming interface (API), corresponding to the image forming operation, based on the received request to perform the image forming operation and a result of the authentication by converting a format of the received request to perform the image forming operation into a predetermined data format for calling the API corresponding to the image forming operation,
    wherein the image forming apparatus performs the image forming operation requested to be performed according to the call from the device, and
    wherein the predetermined data format is JavaScript Standard Object Notation (JSON).

8. A method of performing an image forming operation by an image forming apparatus, the method comprising:
    providing a user interface (UI) screen for receiving a request to perform an image forming operation performable by the image forming apparatus by referring to an interface library comprising information about the image forming operation performable by the image forming apparatus;
    authenticating a user based on authentication information received via the UI;
    calling an application programming interface (API), corresponding to the image forming operation, based on the received request to perform the image forming operation and a result of the authentication by converting a format of the received request to perform the image forming operation into a predetermined data format for calling the API corresponding to the image forming operation; and
    performing the image forming operation requested to be performed according to the call,
    wherein the predetermined data format is JavaScript Standard Object Notation (JSON).

9. The method of claim 8, wherein the interface library comprises information about an application executable by the image forming apparatus.

10. The method of claim 9, wherein the providing of the UI screen comprises:
    providing a UI screen for receiving a request to execute an application, by referring to the interface library;
    executing the application requested to be executed; and
    providing a UI screen for receiving a request to perform the image forming operation by using the application.

11. The method of claim 8, wherein the interface library further comprises:
    identification (ID) information of an image forming operation performable by an operation performer, and
    setting information necessary for performing the image forming operation.

12. The method of claim 8, wherein the interface library is stored in a non-volatile memory.

13. The method of claim 8, wherein the interface library is written in a java script language.

14. A non-transitory computer-readable recording medium having recorded thereon at least one computer program comprising commands, which when executed by a computer, performs a method of claim 8.

* * * * *